United States Patent [19]

Streck et al.

[11] Patent Number: 4,856,046
[45] Date of Patent: Aug. 8, 1989

[54] REMOTE PUBLIC TELEPHONE LINK

[75] Inventors: Donald A. Streck, 832 Country Dr., Ojai, Calif. 93023; Jerry R. Iggulden, 21600 Cleardale St., Newhall, Calif. 91321

[73] Assignees: Jerry R. Iggulden, Santa Clarita; Donald A. Streck, Ojai, both of Calif. ; a part interest

[21] Appl. No.: 179,661

[22] Filed: Apr. 8, 1988

[51] Int. Cl.$^4$ ................................................. H04Q 7/04
[52] U.S. Cl. ........................................ 379/56; 379/144
[58] Field of Search ..................... 379/144, 56, 91, 63, 379/58

[56] References Cited

U.S. PATENT DOCUMENTS

| | | | |
|---|---|---|---|
| 4,535,441 | 8/1985 | Schwaertzel et al. | 370/4 |
| 4,581,770 | 4/1986 | Haworth | 455/601 |
| 4,757,553 | 7/1988 | Crimmins | 455/607 |
| 4,776,000 | 10/1988 | Parienti | 379/62 |

Primary Examiner—Robert Lev
Attorney, Agent, or Firm—Donald A. Streck

[57] ABSTRACT

A public payphone telephone system providing remote access by telephone devices to telephone lines. There are a plurality of public telephone access modules disposed in separated locations and operably connected to telephone lines for receiving remote telephone transmissions and for connecting them to the telephone lines. Each of the public telephone access modules includes visible indicia of its presence and location and a first interface module for wirelessly transmitting and receiving telephone communications by means of a beam of IR energy (or, alternatively, RF) energy. A remote telephone interface is operably associated with each of the telephone devices for interfacing between the telephone device and the public telephone access modules. Each remote telephone interface includes a second interface module for transmitting and receiving telephone communications by means of the beam of IR energy. For privacy, the public telephone access modules are each disposed within a case having a passageway therethrough communicating with the first interface module to create a narrow field of view directly in front of the case. The first interface module is removable from the remote telephone interface and pivotally mounted to create an effective gimbal mounting for ease of pointing. There is a stand-alone unit for plugging various devices (handset, portable computer, portable FAX) into and a telephone handset with the remote interface built in. One version is disposed in combination with a public telephone for use either directly or remotely. Additional privacy is provided by a query mode access and selectably changeable frequency use. A credit billing interface is also provided.

28 Claims, 9 Drawing Sheets

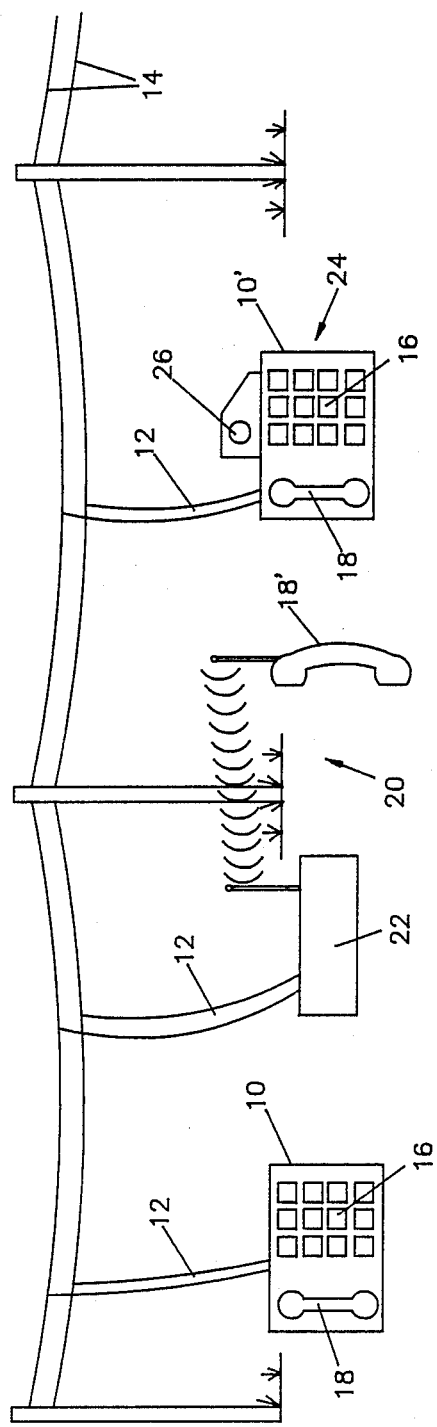
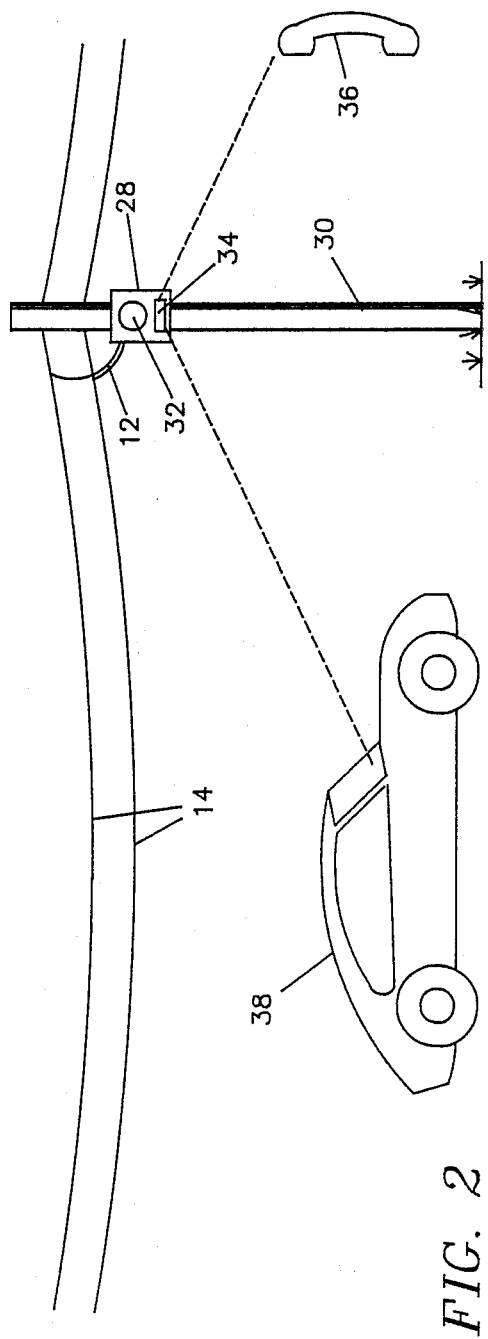
FIG. 1 PRIOR ART
FIG. 2

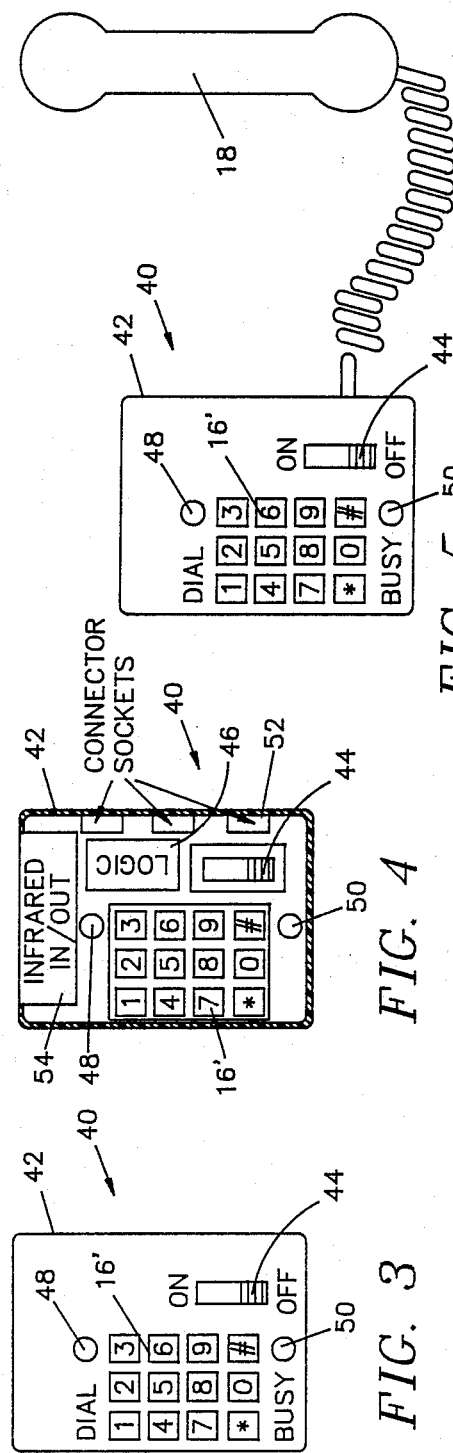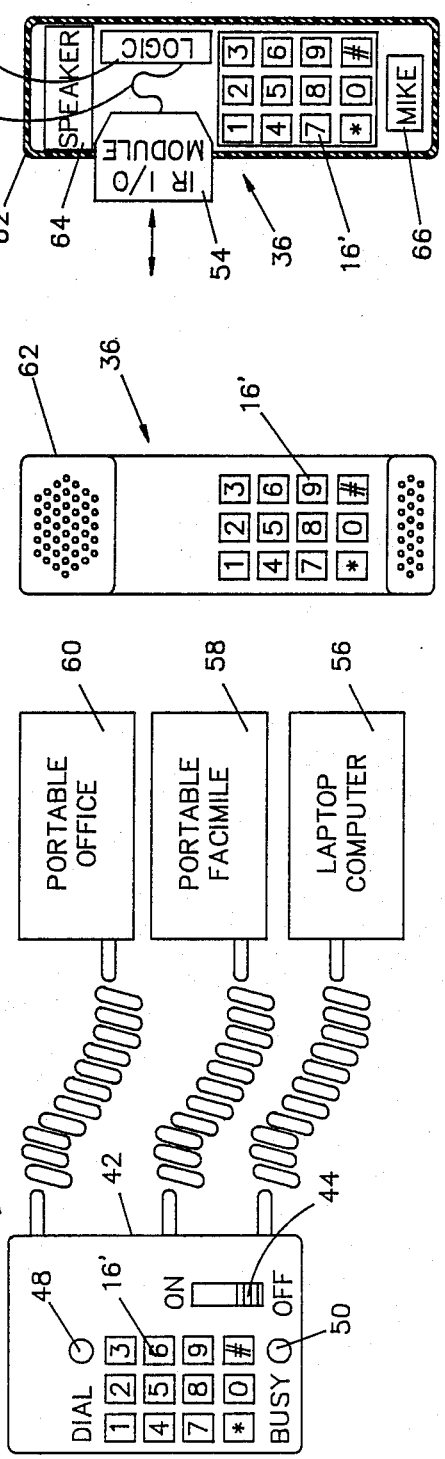

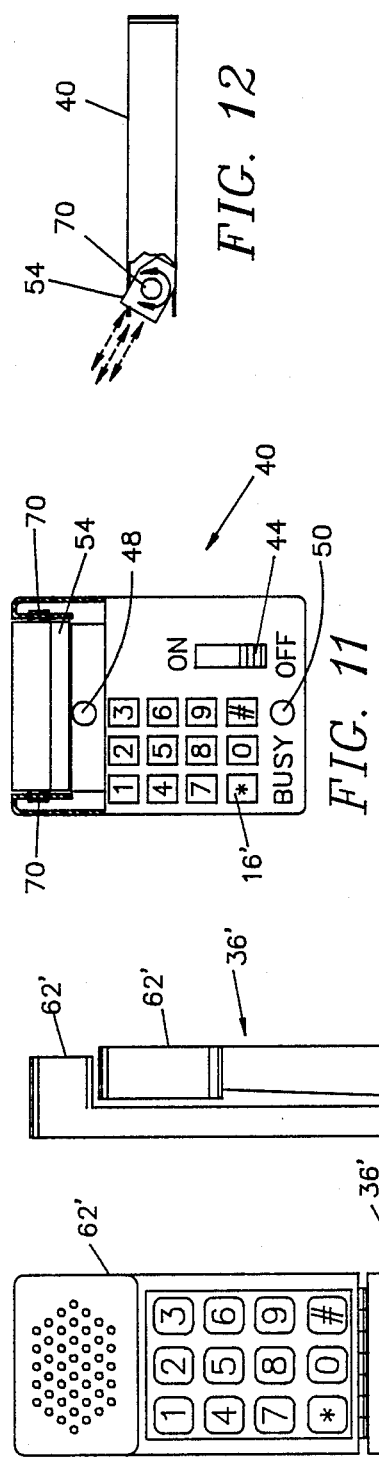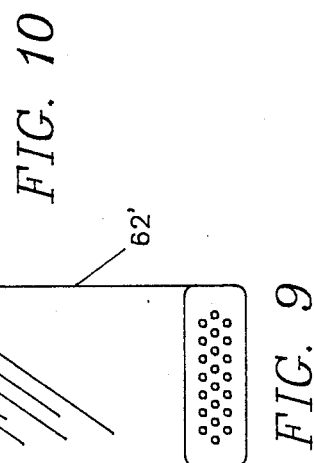

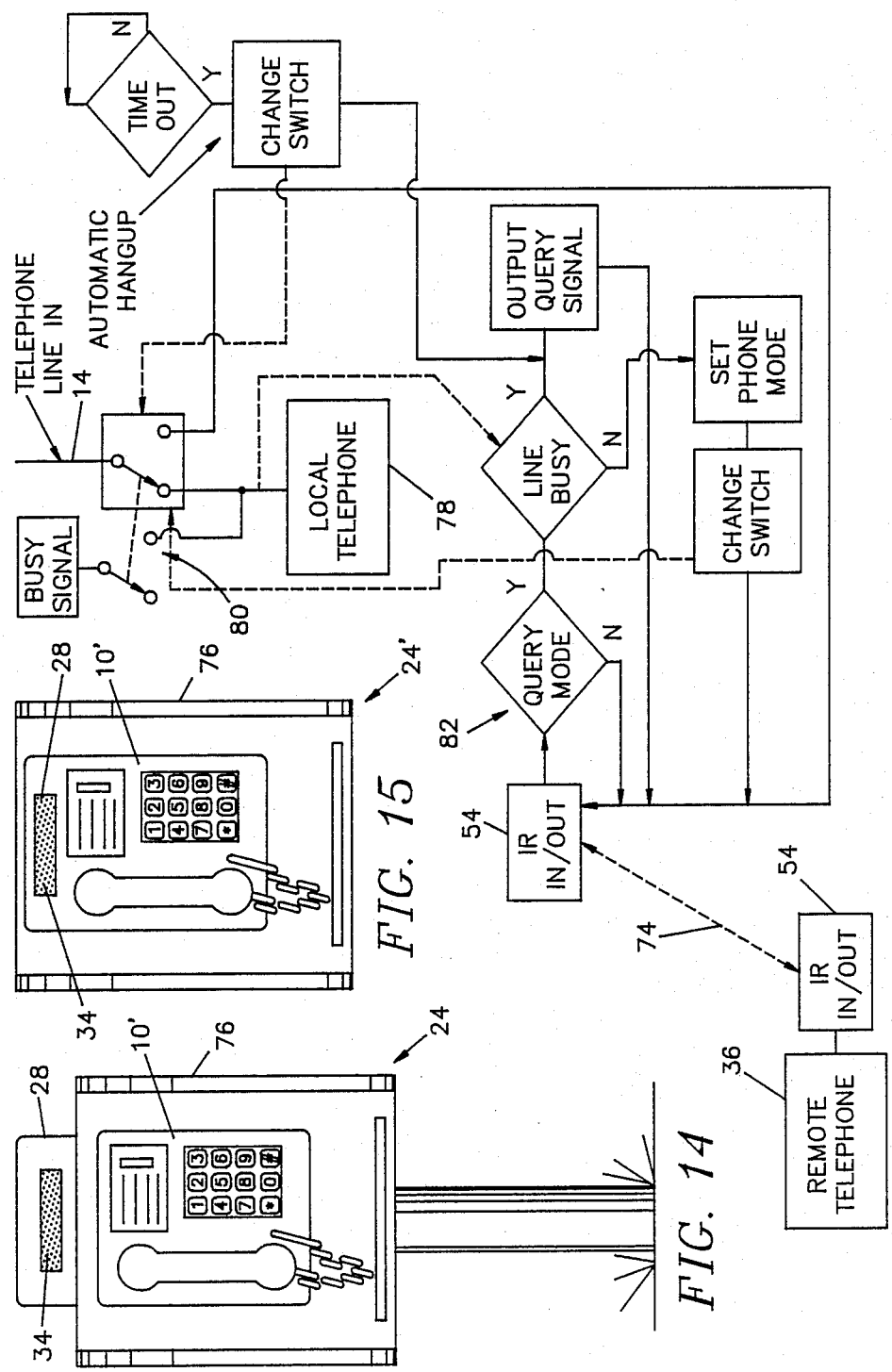

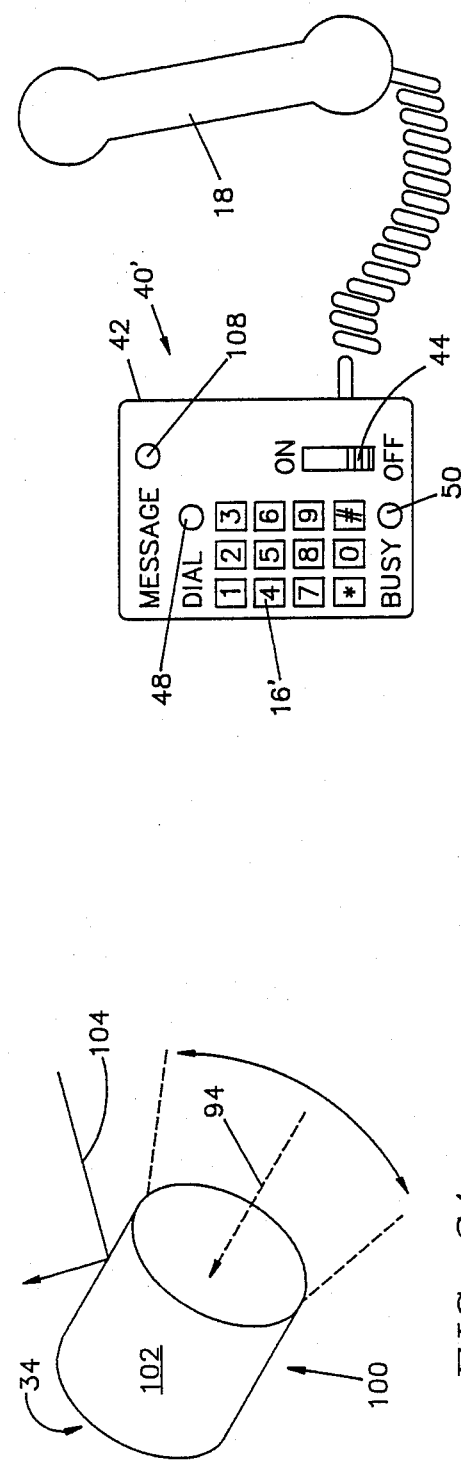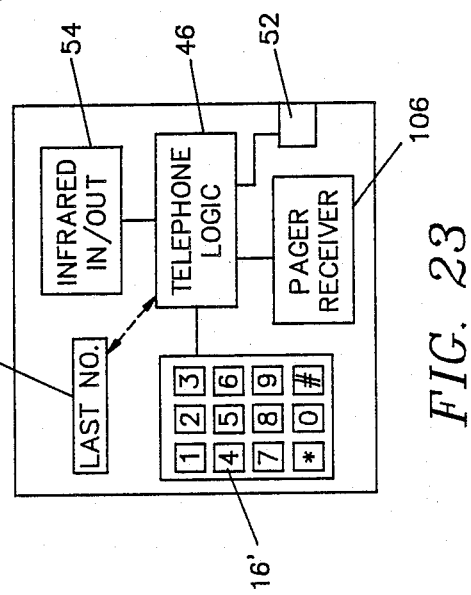

REMOTE PUBLIC TELEPHONE LINK

BACKGROUND OF THE INVENTION

This invention relates to telephone systems and, more particularly, to a public payphone telephone system providing remote access by telephone devices to telephone lines comprising, a plurality of public telephone access modules disposed in separated locations and operably connected to a telephone line for receiving remote telephone transmissions and for connecting them to the telephone line, each of the public telephone access modules including visible indicia of its presence and location and first interface module means for wirelessly transmitting and receiving telephone communications by means of a beam of infrared energy; and, remote telephone interface means operably associated with each of the telephone devices for selectively interfacing between the telephone device and the public telephone access modules, each remote telephone interface means including second interface module means for transmitting and receiving telephone communications by means of the beam of infrared energy.

The telephone has been with us for a long time and has provided a great benefit and service to a great many people. Over the years, additional capabilities have been added to provide services to more people. For example, as depicted in FIG. 1, the most common conventional telephone is a unitary unit 10 connected by so-called "tip" and "ring" wires 12 to the telephone line 14. In many cases, of course, the copper wires that previously comprised virtually all of the telephone line 14 have been replaced by fiber optic cables and high frequency satellite links. For the purposes herein, however, it is sufficient and convenient to depict them as solid wires which, ultimately, lead back to a central office of the telephone company where switching and billing can take place. The unit 10 contains a "touch tone" input pad 16 which allows the user to dial a telephone number or apply information to the telephone line 14 by means of variations in audible tones associated with the various buttons comprising the pad 16 in lieu of the rotary mechanical switching mechanism that was used previously. There is also a handset 18 including a speaker which is placed over the user's ear and a microphone which is placed in front of the user's mouth.

Recently, the so-called remote telephone, generally indicated as 20 in FIG. 1, has become popular. With such a device, the base station 22 is connected by the wires 12 to the telephone line 14. The base station 20, in turn, is connected to the handset 18' by a radio frequency link instead of wires. The user is thus free to walk about with the handset 18' and call out, or answer incoming calls, from anywhere within the transmitting radius of the base station 22. A variation of the remote telephone 20 is the so-called "cellular telephone" (not shown). These are popular among users who need to, or simply desire to, make and receive telephone calls from their car, boat, airplane, or the like. While the remote telephone 20 has a limited transmission power, centralized within each adjoining "cell" of the cellular system is a transmitter/receiver operating under license from the Federal Communications Commission (FCC) and, therefore, able to transmit with greater power. While cellular telephones are very handy, they are generally impractical for high-volume common usage. For one thing, the individual units carried in the vehicle are quite expensive. Not only that, the number of people who can be accessing each cell at one time is relatively small. At that point, the time-sharing arrangement employed becomes saturated and no further calls can be accommodated. The problem would, of course, be exacerbated when one applies the current growth rate of cellular phone usage with the fixed availability of the equipment. As stated in a recent article, cellular phones also pose several safety questions. What if you are too busy negotiating a business deal to notice a car crossing in front of you? How can you keep your eyes on the road while dialing? Driver inattention is a leading cause of auto accidents. Insurance companies, the American Automobile Association, and the owner's manual that comes with some cellular phone all recommend pulling off the road to talk.

Finally, there is the public telephone or so-called "pay phone" 24 of FIG. 1. While pay phones and the conventional "telephone booth" of old have been updated in their dress and internal components, the underlying functional aspects of pay phones have not changed appreciably since their inception. Basically, there is a unit 10' having a touchtone pad 16 and a handset 18 connected to the telephone line 14 by wires 12. To this is added a coin slot 26 by means of which the call being made can be paid for in cash. More recently, the capability of inputting a billing number into the pad 16 has been provided along with pay phones that read the magnetic strips on credit cards for direct credit billing.

The story of the pay phone is a sad one. The operating companies spend vast amounts to collect and process the coins involved as well as to repair damage. While coin theft is sometimes the underlying motivation, vandals cause millions of dollars yearly in damage to pay phones, in general, for reasons nobody knows or understands. Pay phones have been strengthened in their construction so as to become electronic strong boxes, to little avail. As a consequence, there are fewer public phone booths available for use than in years past —particularly in outside locations. It is not uncommon after searching for some time just to find a phone booth, to find that the handset has been ripped out or chewing gum forced into the coin slot, rendering the instrument useless. The same is true for the free emergency phone boxes placed along side major highways at intervals to provide telephone access to stranded motorists. Vandals seem to take some sort of fiendish delight in beating the instruments to death with hammers, clubs, or what have you. In this case, it cannot be for the coins as the phones have no coin slot and are provided as a public service. As a result, many public authorities are forced to spend a good portion of their available funds to repair existing vandalized emergency telephone equipment instead of being able to expand their system and provide greater service.

And, for many people, even when a public telephone can be found in working condition, the situation is not a good one. The scenarios are all too familiar. A woman, alone or with small children, is in her car in a secluded spot and needs to make a telephone call. She sees a telephone booth but really is not happy about getting out of the car to use the phone and rightly so. Persons using public telephones and automated teller machines are well-known victims of muggers and thieves. Then there are the handicapped. A specially equipped car gives a wheelchair's occupant mobility. Public telephones are supposed to be made available for use from a wheelchair; but, as noted previously, there are not that many public telephones in general use anymore, much less at wheelchair height. And, the number of working telephones and their locations are a constantly changing aspect of public telephone use based on vandal and repair activity. Picture the following not uncommon situation for such persons. It is a rainy night and the wheelchair occupant in his wheelchair lift equipped van needs to make a telephone call. After driving around and around, he finally finds one of the lowered public telephones. He sits and looks, wondering if he should go through the trouble of getting out of the vehicle in the rain in his wheelchair. Will the phone work after he gets there? Is there a mugger or robber just waiting to take advantage of the situation? Getting wet is not even a question, it is a foregone conclusion.

Other examples of the shortcomings of the conventional "public" phone are easily brought to mind. The person who has to leave the table in a restaurant to make a telephone call. The salesman using a phonebooth as a temporary office to call orders back to the main office with the phone gripped between his ear and shoulder, notebook in hand, and the remainder of his materials falling off of the too-small shelf (if any) provided for the purpose. The vast numbers of phone booths that must be provided in special locations in airports, and the like.

Wherefore, it is an object of the present invention to provide a remote access link to public telephones and/or the public telephone system which is inexpensive for both user and operator and will allow one to use a public telephone's access to the telephone lines without having to physically access the public instrument itself.

It is another object of the present invention to provide a remote access link to public telephones which will allow one to use a public telephone from a vehicle without having to leave the vehicle.

It is still another object of the present invention to provide a remote access link to public telephones which will allow one to use electronic devices over a public telephone's lines.

It is still a further object of the present invention to provide a remote access link to public telephones which is virtually vandal-proof while providing greater convenience for users and greater profits for suppliers.

Other objects and benefits of the present invention will become apparent from the description contained hereinafter taken in conjunction with the drawings which accompany it.

SUMMARY

The foregoing objects have been achieved by the public payphone telephone system of the present invention providing remote access by telephone devices to telephone lines and comprising, a plurality of public telephone access modules disposed in separated locations and operably connected to a telephone line for receiving remote telephone transmissions and for connecting them to the telephone line, each of the public telephone access modules including visible indicia of its presence and location and first interface module means for wirelessly transmitting and receiving telephone communications by means of a beam of infrared energy; and, remote telephone interface means operably associated with each of the telephone devices for interfacing between the telephone device and the public telephone access modules, each remote telephone interface means including second interface module means for transmitting and receiving telephone communications by means of the beam of infrared energy. Alternately, radio frequency can be used in lieu of the infrared beam.

In the preferred embodiment, the public telephone access modules are each disposed within a case having a passageway therethrough communicating with the first interface module means and including means for limiting the area from which the beam of infrared energy can enter the public telephone access module to a narrow field of view directly in front of the case. Additionally, the first interface module means includes infrared detector means for detecting the beam of infrared energy and for developing an electrical signal therefrom and the passageway includes fiber optic conducting means for conducting the beam of infrared energy between the opening and the infrared detector means. For handling multiple users, the first interface module means includes a plurality of the infrared detector means; the passageway includes a plurality of the fiber optic conducting means for conducting a plurality of the beams of infrared energy between the opening and respective ones of the infrared detector means; and additionally, the public telephone access modules is connected to a plurality of telephone lines and includes logic for selectively connecting the electrical signals from the plurality of the infrared detector means to individual ones of the plurality of telephone lines.

To provide greater flexibility of use, the first interface module means is removable from the remote telephone interface means whereby the first interface module means can be placed on a stable surface and pointed with the beam of infrared energy directed at the public telephone access modules. In the preferred embodiment, the first interface module means is pivotally mounted in the remote telephone interface means for movement in a vertical plane whereby the remote telephone interface means can be placed on a stable generally horizontal surface and the remote telephone interface means and the first interface module means in combination can be rotated to point the beam of infrared energy at the public telephone access modules.

Further in the preferred embodiment, the remote telephone interface means includes indicator means for visually indicating when a connection to the telephone line has been established and dial means for dialing a number to the telephone line. In an interface embodiment to be used with various plug in devices from a handset to a portable computer, the remote telephone interface means includes jack means for operably connecting a telephone line using device thereto by plugging it into the jack means.

For conversation use only, the remote telephone interface means is disposed in a hand-holdable case including means for indicating when a connection to the telephone line has been established, dial means for dialing a number to the telephone line, a microphone for speaking into, and a speaker for listening to.

For retrofiting applications, the public telephone access modules are disposed in association with public telephones of the type including a handset connected for use at the location of the public telephone and additionally comprising logic means for selectively connecting the handset or the public telephone access module, but not both, to the telephone line at any one time and for causing a busy signal to occur in the one not connected to the telephone line if the not connected one is attempted to be used by a user.

In the preferred operation of the present invention, the remote telephone interface means includes logic for generating a query signal on the beam of infrared energy to be received by the public telephone access module when the remote telephone interface means desires to establish a link with a public telephone access module and for generating a busy signal to a user if a query signal is received in response from the public telephone access module; and, the public telephone access modules include logic for generating a query signal on the beam of infrared energy to be received by the remote telephone interface means when the public telephone access module is unable to connect the remote telephone interface means to the telephone line whereby a user knows that an infrared link has been established but no telephone line is presently available.

In an alternate embodiment, the remote telephone interface means additionally includes pager receiver means for wirelessly receiving a telephone number to be called and dial means for dialing the telephone number to be called to the telephone line.

In the preferred embodiment for use by a number of users at a common location, the public telephone access modules are connected through a switching circuit to a plurality of telephone lines and include logic for generating a next frequency to use signal on the beam of infrared energy to be received by the remote telephone interface means when the public telephone access module has an unbusy one of the telephone lines available and for generating a no frequency available signal on the beam of infrared energy to be received by the remote telephone interface means when the public telephone access module has no unbusy one of the telephone lines available; and, the remote telephone interface means includes logic for switching to the frequency designated by the next frequency to use signal if received and for generating a busy signal to a user if a no frequency available signal is received.

DESCRIPTION OF THE DRAWINGS

FIG. 1 is a simplified drawing depicting several prior art telephone systems as are known in the art.

FIG. 2 is a simplified drawing depicting the basic purpose and mode of operation of the present invention.

FIG. 3 is a plan view of a stand-alone, remote, infrared, telephone link according to the present invention.

FIG. 4 is a cutaway view of the link of FIG. 3.

FIG. 5 is a drawing showing how the link of FIG. 3 can be provided with a conventional telephone handset to create a remote telephone for accessing a public telephone location according to the present invention.

FIG. 6 is a drawing depicting how the link of FIG. 3 can be used to connect various other devices to a public telephone location according to the present invention.

FIG. 7 is a simplified front view of a telephone handset according to the present invention incorporating a link such as that of FIG. 3 therein.

FIG. 8 is a cutaway view of the telephone handset of FIG. 7 showing how the infrared input/output module is removable in the preferred embodiment.

FIG. 9 is a simplified, opened, front view of a telephone handset according to the present invention such as that of FIG. 7 wherein the handset folds in half for ease of storage in the pocket or purse.

FIG. 10 is a side view of the folding telephone embodiment of FIG. 9 in the folded position.

FIG. 11 is a partially cutaway detailed drawing of the link of FIG. 4 showing the preferred manner of pivotally mounting the infrared input/output module therein.

FIG. 12 is a side view of the link of FIG. 11 showing the infrared input/output module pivoted upward to align with a matching module on the telephone connection end in a raised location.

FIG. 13 is a simplified drawing showing the preferred manner of placing the matching module for making a telephone connection in a public place on the ceiling or roof.

FIG. 14 is an elevation drawing showing a public telephone having a retrofit module according to the present invention added thereto.

FIG. 15 is an elevation drawing showing a public telephone according to the present invention having the infrared input/output module incorporated therein.

FIG. 16 is a logic flowchart showing the basic logic of the present invention employed to connect the infrared input/output module in combination with a conventional telephone sharing the same telephone line.

FIG. 19 is a simplified side view of the light conducting and sensing portions to be associated with the sensing portion of FIG. 18, or the like.

FIG. 21 is a perspective drawing of a shroud to be added over the opening to the PTAM of the present invention in environments where stray IR radiation is to be rejected.

FIG. 22 is a drawing of an alternate embodiment wherein the present invention is incorporated into a telephone pager.

FIG. 23 is a functional block diagram of the telephone pager of FIG. 22.

DESCRIPTION OF THE PREFERRED AND ALTERNATE EMBODIMENTS

Figure 17:
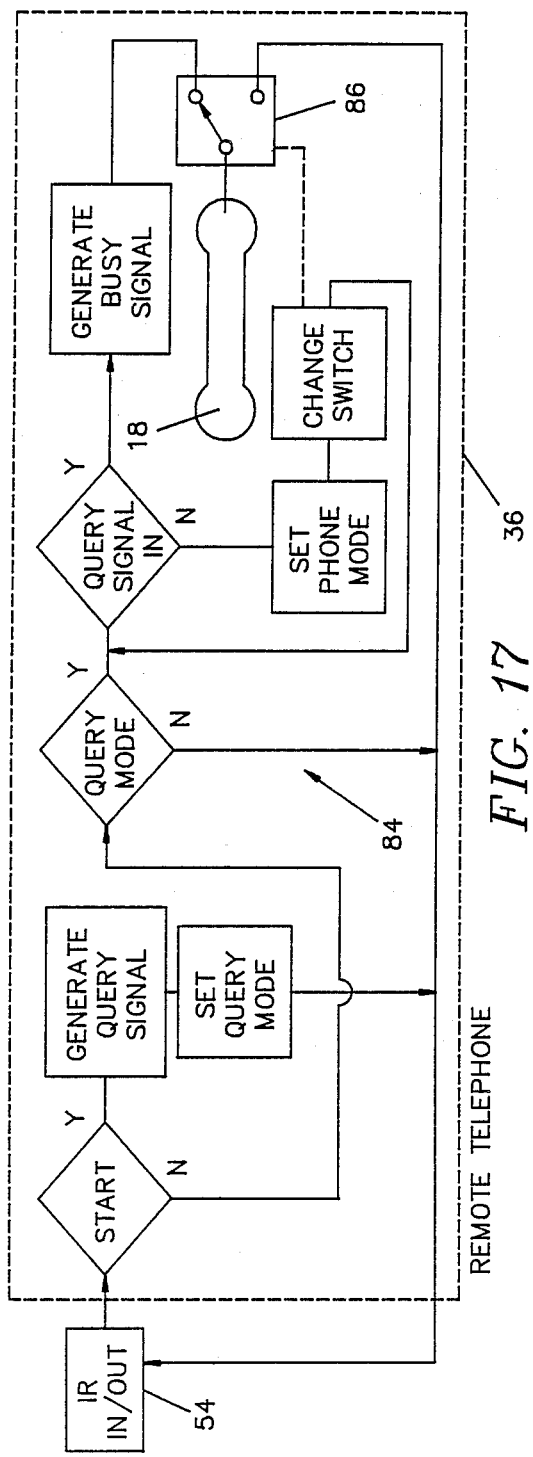
FIG. 17 is a logic flowchart showing the basic logic of the handset portion of a remote telephone link according to the present invention.

The basic premise of the present invention is depicted in FIG. 2. As shown therein, a public telephone access module (PTAM) 28 is provided at convenient locations, such as mounted on the telephone pole 30. The PTAM 28 is connected to the telephone line 14 by wires 12 in the usual manner. It can be placed in virtually inaccessible locations and be of bulletproof materials, if necessary, so as to virtually eliminate the vandal problems of ordinary public telephones. There is an indicia 32 (perhaps a specially colored light) to provide an indication of its location. An infrared input/output module contained therein is optically accessed through the opening 34. A remote telephone handset 36 can be used to access the PTAM 28 or, a remote link (not shown in this figure) within the car 38 can be employed for the same purpose. It should be noted at this point that while a radio frequency connection between the PTAM 28 and handset 36 or remote link can be employed (and is considered to be within the scope and spirit of the present invention), infrared (IR) is the preferred medium (even through it is line of sight) because of the low cost, lack of interference, and pure signal that is achieved thereby. Use of line of sight IR also addresses the safety problem of cellular telephones by forcing a driver to get off the road and stop in order to make a telephone call.

It should probably already be appreciated at this point that the handset 36 or remote link must be provided by the user, as opposed to the "conventional" public telephone where the entire mechanism is provided at and, in fact, a part of the site—unless already ripped out by vandals. While this may seem to be an inconvenience at first impression, since the "unbundling" of AT&T by the government, a large percentage of persons with phone service own their own instrument(s) so owning another instrument for public telephone access would not be a great inconvenience compared to the benefits achieved thereby. Also, as will be appreciated from the description which follows hereinafter, the cost of the handset 36 will be extremely low such that owning several for carrying in the pocket, purse, briefcase, glove compartment, and the like, will be no great personal or financial inconvenience. For public and private agencies mandated to provide telephone access for the handicapped, and the like, it will be far more cost effective for them to provide individuals with handsets free of charge than to relocate public telephones at lower levels with the attendant physical protection required for them and repair them after vandal attacks. Such equipment could also be provided by automobile manufacturers built in to their vehicles as optional equipment for both handicapped and non-handicapped users. With such a handset in the glove compartment of a vehicle, the problem of vandal-proof emergency telephones is eliminated. Pole-mounted PTAM units such as that of FIG. 2 would eliminate the need to separate emergency telephones along the roadside.

The basic IR input/output link (IRIOL) of the present invention is shown in FIGS. 3 and 4 wherein it is generally indicated as 40. The preferred IRIOL 40 is housed in a plastic case 42 about the size of a conventional hand-held calculator. There is a conventional "telephone" input pad 16, which can be conveniently and inexpensively of the so-called "membrane switch" type. There is an ON-OFF switch 44, a logic board 46, a pair of indicator light emitting diodes (LEDs) 48, 50, one or more connector sockets 52 (preferably of the type normally employed to connect telephone components for ease of component acquisition and use) connected to the logic board 46, and an IR input/output module (IRIOM) 54. Power can be supplied in any or all of several ways well known in the art for such electronic apparatus including disposable batteries, rechargeable batteries, plugging into the cigarette lighter socket of a vehicle, or an AC adapter for plugging into a 110 volt wall socket.

As shown in FIG. 5, with a conventional telephone handset 18 plugged into one of the connector sockets 52, the IRIOL 40 and handset 18, in combination, provide a telephone by means of which the user can access the PTAM 28 and make a call therethrough. The specifics of the process and the logic involved within logic board 46 will be addressed in greater detail shortly.

As shown in FIG. 6, the IRIOL 40 can also be used (typically from a vehicle) to access the public telephone line 14 via a PTAM 28 for the purpose of operating a laptop computer 56 as a remote input terminal to a time-shared computer; or, operating a portable facsimile (FAX) machine 58; or, operating a portable office 60. In this regard, attention is directed to co-pending application Ser. No. 07/173882, filed 3/2/88, and entitled PORTABLE ELECTRONIC OFFICE AND COMPONENTS which describes several such devices well suited for operation with the present invention. Using such devices in combination with the remote link of the present invention, salespersons, or the like, can conduct business in comfort and convenience from their own car.

Turning now to FIGS. 7 and 8 the remote telephone handset 36 of the present invention from FIG. 2 is shown in a first embodiment. While the IRIOL 40 as described above is preferred for most commercial uses, the remote handset 36 will be the most commonly used configuration of the present invention to provide voice communications only. The handset 36 comprises a thin, lightweight, plastic case 62 having a speaker 64 in one end and a microphone 66 in the other end. As with the IRIOL 40, there is a conventional "telephone" input pad 16' of the membrane switch type. There is an ON-OFF switch (not shown for convenience), a logic board 46, and an IR input/output module (IRIOM) 54. Again, power can be supplied in any several ways well known in the art such as disposable batteries or rechargeable batteries. While the IRIOM 54 can be built into the case 62, that would require the user to position the handset 36 so that the IROM 54 was pointed at the PTAM 28 during use. While in very inexpensive units intended for emergency use only that would be acceptable, it is preferred that the IROM 54 be removable from the case 62 and be connected to the logic board 46 by a length of electrical wire 68 (or fiber optic cable) so that the IRIOM 54 can be placed on a surface pointing at the PTAM 28 while the remainder of the handset 36 is held in a convenient position for the user. It may be desirable to have the wire 68 attached to a spring-powered, lockable, retracting mechanism so as to avoid having to manually unwind and wind it.

A variation of the above-described handset is shown in FIG. 9 and 10 and indicated as 36' therein. In this version, particularly intended for carrying in the pocket or purse, the case 62' is hinged in the middle such that the two halve fold over one another. In all other regards, the functional construction of the handset 36' is virtually the same.

The preferred manner of mounting the IRIOM 54 within the IRIOL 40, or otherwise, is shown in FIGS. 11 and 12. The IRIOM 54 has pins 70 extending from the ends thereof by means of which the IRIOM 54 can be supported as shown for pivoting in a vertical plane. The IRIOL 40, on the other hand, can be pivoted horizontally on the surface upon which it is sitting. As a result, the IRIOM 54 is effectively gimbal-mounted so that it can be pointed virtually in any direction while sitting on any surface such as a dashboard, shelf, table, or such. For example, the preferred manner of mounting the PTAM 28 in a restaurant, waiting room, or other similar area containing a number of seating locations is shown in FIG. 13. By placing the PTAM 28 on the ceiling 72, the IR link 74 to the IRIOL 40 can be established from any location in the room without interference from passing persons. While not specifically shown in the figures, it is contemplated that more costly commercial embodiments of the IRIOL 40 may include a powered, signal-seeking drive for an actual gimbal-mounted IRIOM 54 so the IRIOM 54 can be pointed in the general direction of the PTAM 28 and, thereafter, automatically direct itself into proper alignment therewith. Further mechanical aspects of the PTAM 28 relating to multiple users, privacy and interference rejection will be addressed hereinafter.

While the PTAM 28 as hereinbefore described can be employed as a stand-alone device mounted on the outside or inside of building as well as to holes along the streets and highways, it is also intended that it be employed in conjunction with standard public telephones so as to inexpensively increase the capabilities of such instruments. In this regard, see FIG. 14 where the PTAM 28 is mounted on top of the privacy booth 76 of a pay phone 24 and shares the common telephone line 14 therewith. Such an embodiment could be provided as an easy retrofit to an existing telephone, for example in lieu of lowering the phone 24 and booth 76 to provide wheelchair access -- and for far less cost. As shown in FIG. 15, the PTAM could be incorporated directly into a pay phone 24' for future or replacement installations for the same purposes.

The type of logic and switching apparatus contemplated for either of these line-sharing configurations is shown in FIG. 16. The telephone line 14 coming into the local telephone 78 is disconnected and reconnected to one half of the two position switch 80 instead. In its normal position as shown in the figure, switch 80 connects the local telephone 78 to the telephone line 14 and operation is in the usual manner. When an IR link 74 is established between the IRIOM 54 of the remote telephones 36 and the IRIOM 54 connected to the logic 82, the remote telephone 36 initially transmits in a query mode; that is, it transmits a recognizable query signal. As will be appreciated from the description which follows, this provides privacy in that only one remote telephone 36 (or IRIOL 40) can gain access to a telephone line for conversational purposes at a time. If the logic 82 finds that the received signal indicates that the remote telephone 36 is in the query mode (i.e. attempting to initiate a call), it checks to see if the telephone line 14 is busy (indicating that the local telephone 78 is in use. If the line 14 is busy, the logic 82 outputs a query signal back to the remote telephone 36 via the IR link 74. As will be seen from other logic to be described shortly, the logic of the remote telephone 36 generates its own "busy signal" when it detects a returning query signal from the logic 82 over the IR link 74.

If the line is not busy, the logic 82 sets the mode as "phone" and changes the switch 80 to connect the IRIOM 54 to the telephone line 14 so that normal telephone interaction can take place between the remote telephone 36 and the telephone line 14 over the IR link 74. Note that when the switch 80 is switched to disconnect the local telephone 78, the logic 82 places a busy signal on the line connected to the local telephone 78 through the other half of switch 80 so that persons lifting the handset of the local telephone 78 will not think that the telephone is out of order.

Turning now to FIG. 17, some of the logic and switching circuitry for a remote telephone 36 to operate with the logic 82 of FIG. 16 is shown. At the start (i.e. when the switch 44 is turned to the "ON" position), the logic 84 sets itself to the query mode and generates a query signal which is output over the IRIOM 54. This is an important aspect of the privacy aspects of the present invention. Prior art remote telephone such as that described with respect to FIG. 1 have privacy only because there is generally a private environment wherein the phone is used; that is, a homeowner buys a remote phone having a matched base and portable handset. It is used within the confines of the house and yard. Thus, there is no one else within reception distance of the base station to listen in on the conversation—which they could do since the RF transmission is available for anyone within the reception radius. With a remote telephone for accessing a public base station as proposed by the present invention, privacy becomes a major factor. No one wants to return to the days of so-called "party lines" where anyone on the same line could listen and talk simultaneously. Thus, by having the remote telephone 36 initially enter a query mode which cannot be changed without an open line available for use, only one person at a time can access a telephone line 14 through its associated PTAM 28—even though standing side by side.

Upon getting a return signal through the IRIOM 54, the logic 84 at the remote telephone 36 looks at it and if it is in the query mode (i.e. trying to get an open line) and if a query signal has been returned from the PTAM 28, as described above, the logic maintains the switch 86 in its startup position as shown in FIG. 17 and applies a locally generated busy signal thereto. This indicates two facts to the user. First, that they have established an IR link to the PTAM 28. Second, that the telephone line is busy. When in the query mode and a non-query signal is returned (such as a dial tone from the telephone line), the logic 84 sets itself to the phone mode and changes the switch 86 to connect the handset 18 to the IRIOM 54 so that normal telephone interaction can take place between the remote telephone 36 and the telephone line 14 over the IR link. Having thus described the present invention in general and as applied to a specific application, several special features to be associated with the present invention and alternate embodiments thereof will now be discussed.

Figure 19:
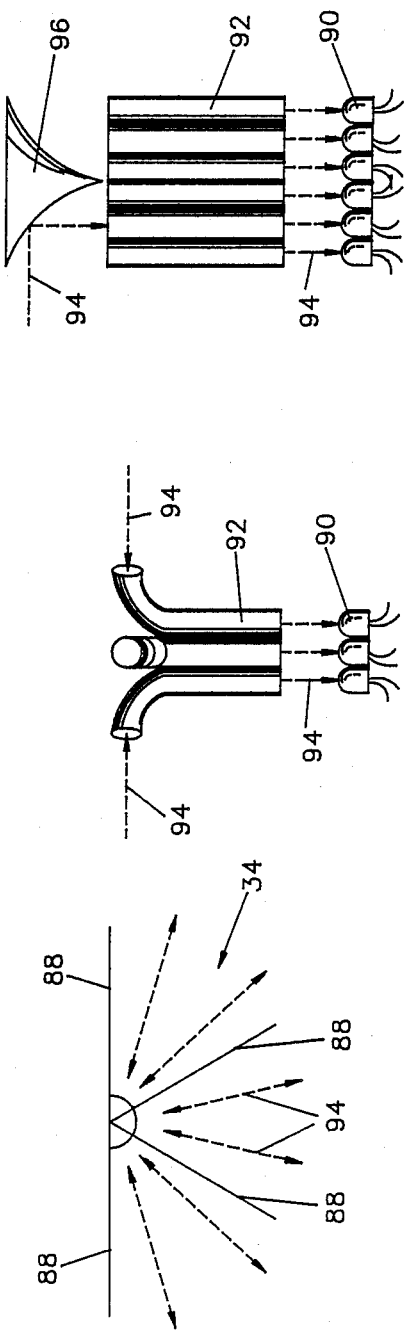
Figure 18:
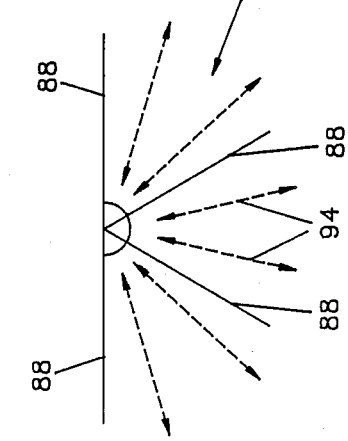
FIG. 18 is a simplified top view showing the preferred manner of mechanically dividing the sensing portion of the infrared input/output module associated with the public telephone into exclusive regions for privacy.
Figure 25:
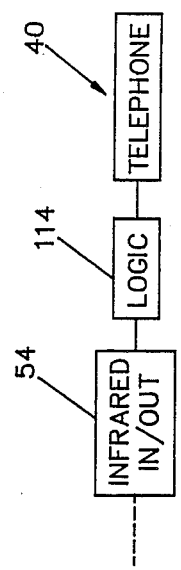
FIG. 25 is a simplified functional block diagram of the remote telephone portion of the multi-line telephone system of FIG. 24.

Quite often, it will be desirable to have a single PTAM 28 for remote access to several telephone lines. A public telephone location in a parking lot or in front of a convenience store, for example, might provide access to two or three lines while a waiting room of an airport may need to provide ten or twenty. While it is possible to employ different frequencies between the remote telephone 36 (or an IRIOL 40) and the PTAM 28 for each of the telephone lines in use, and embodiments employing that approach will be described shortly, the simple mechanical approach now to be described may be a preferred solution to the multi-line access question. FIG. 18 is a simplified top view of the opening 34 of a PTAM 28 intended to be placed on a wall of a building, or such. Four vertical divider panels 88 divide the 180 degree field of vision into three 60 degree fields of vision as shown. Thus, if there are three adjacent parking places in front of the PTAM 28 there will be a natural physical division of the points of use with one within each of the three 60 degree fields of vision. An arrangement as shown in FIG. 19 could then be used to conduct the IR link from the remote telephone 36 or IRIOL 40 in each of the vehicles to an associated IR detector 90 located in the PTAM 28. Specifically, there is a fiber optic bundle 92 for each of the three 60 degree fields of vision. One end is disposed within the apex of the angle formed by adjacent pairs of the divider panels 88 so as to have IR light beams 94 directed into it. The IR light beams 94 are then conducted by the light pipe qualities of the fiber optic strands onto the associated IR detector 90 to generate an electrical signal employed within the logic 82 of the PTAM 28 as described earlier.

Figure 20:
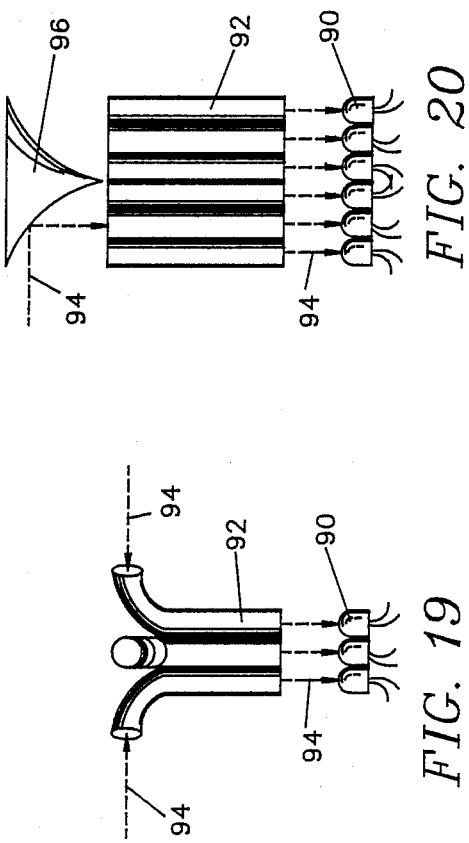
FIG. 20 is a side view of an alternate embodiment for dividing the sensing portion of the infrared input/output module associated with the public telephone into exclusive regions for privacy and the sensing portions to be associated therewith.

Another embodiment of a PTAM input interface for use on a ceiling with multiple telephone lines is depicted in FIG. 20. In this instance, there is a quasi-conical reflector 96 having a parabolic curve to its outer reflective surface. As a result, light beams 94 from anywhere within a vertical plan will be reflected downward towards the focal point of the parabola in that plane. If a cylindrical cluster of fiber optic bundles 92 are disposed concentrically about the apex of the "cone" as shown, there will be a series of de-facto radial fields of vision whose radial extent will be determined by the diameters of the bundles 92. As with the prior embodiment the bottom ends of the bundles 92 terminate adjacent an IR detector 90. Thus, from virtually anywhere in the room one can direct the IR beam 94 from his instrument onto the PTAM 28 located on the ceiling and establish an IR link 74. With these multi-line embodiments, of course, the logic 82 of the PTAM 28 would have to employ a rotary switching logic to interconnect the respective detectors 90, when input to, to an available telephone line 14. The providing of such logic is well within the capability of those skilled in the art without undue experimentation and, therefore, in the interest of simplicity and to avoid redundancy, such additional logic is not shown in the figures and will not be described herein.

Turning now to FIG. 21, it should be noted that where the PTAM 28 is to be in an outside environment and subject to outside IR light sources such as sunlight, a shroud 100 should be placed over the opening 34. The shroud 100 can be cylindrical, as shown, or any shape that is desired. All that is required is the formation of an elongated tube 102 down which the IR light beams 94 of interest must travel. Preferably, the inside of the tube 102 is of a flat black or other non-reflective material. The shroud 100 blocks other light rays 104 from reaching the opening 34 as depicted in the figure. It also makes a narrower window of acquisition for privacy purposes; that is, an actual user must be within a very narrow area to either side of a line directly down the center of the tube 102 in order to focus an IR light beam 94 into the opening 34 and receive a return beam therefrom.

Figure 26:
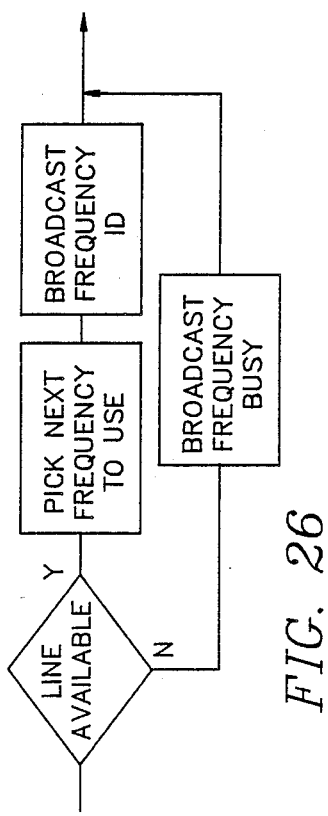
FIG. 26 is a logic flowchart showing one portion of the basic logic of the PTAM portion of the multi-line telephone system of FIG. 24.

Another general embodiment of the present invention is shown in FIGS. 22 and 23. In this instance, the IRIOL 40' includes a pager receiver 106 therein. When the pager number is dialed, the pager receiver 106, which is connected to the telephone logic 46, responds with an audible "beep" and lights an LED 108 to indicate that the pager has been called. Whereas in the prior art the users of pagers must call a specific number to receive their message (with older systems) or get an alpha-numeric message viewable through an LCD display (which may include a telephone number to call), the present invention receives the telephone number to call as the message, which is then stored in the last number dialed memory 110. The same memory 110 is used in the usual manner to store the last number dialed into the pad 16' by a user. By depressing the "#", the user can automatically dial the number contained in the memory 110—which can either be the last number dialed or the number provided by a pager call.

Where greater privacy is desired, at a slight additional cost for additional components and more complexity, the approach of FIGS. 24-28 can be employed with the present invention. The approach is equally applicable to IR or RF implementation—although IR is still preferred for the reasons stated previously. It also has an extensive bandwidth which makes it easily adaptable to this approach. As shown very broadly in FIG. 24, the PTAM 28 has a plurality of telephone lines 14 coming into a switching circuit 110 connected to the IRIOM 54 and logic 112. The switching circuit 110 is also controlled by the logic 112. The corresponding "telephone" block diagram is contained in FIG. 25 and comprises logic 114 disposed between the IRIOM 54 and the "telephone", which can be any of the user devices hereinbefore described. For convenience only, it is generally indicated as 40 in the figure. As shown in FIG. 26, the transmitting portion of the logic 112 checks to see if one of the incoming telephone lines 14 is available, i.e. not busy. If it is, the logic 112 picks a next available frequency on a random basis. If, for example, 1,000 frequencies are employed and the next frequency to used is picked on a random basis, persons trying to listen in on a conversation will have a difficult time even finding the conversation and will be discouraged to try. Whereas in the previously described logic the process of establishing an IR link 74 between the PTAM 28 and the user was totally initiated by the user and the PTAM 28 was entirely passive, in this approach the PTAM 28 is semiactive in that it broadcasts its frequency data on a commonly known frequency that is sampled by the user's device in the process of initiating a link. Thus, if there is a line available, the logic 112 broadcast the identification number of that frequency. If no line is available, the logic 112 broadcasts a "busy" frequency identification number.

Figure 28:
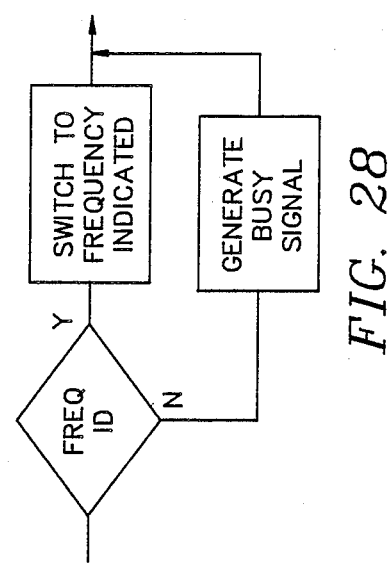
FIG. 28 is a logic flowchart showing the basic logic of the remote telephone portion of the multi-line telephone system of FIG. 24.
Figure 24:
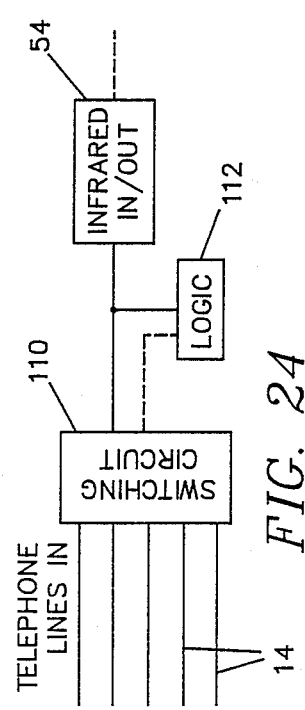
FIG. 24 is a simplified functional block diagram of the PTAM portion of a multi-line telephone system according to the present invention in an alternate embodiment.
Figure 27:
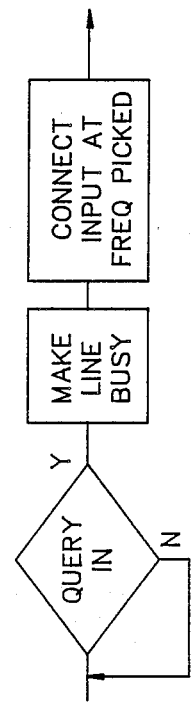
FIG. 27 is a logic flowchart showing another portion of the basic logic of the PTAM portion of the multi-line telephone system of FIG. 24.

The receipt portion of the logic 112 is shown in FIG. 27. The logic 112 waits until it gets a query signal in on the frequency it has been broadcasting as available. At that time, it makes an available line busy and connects the line to the IRIOM 54 through the switching circuit 110 associated with that frequency. Correspondingly, the logic 114 of the user device is shown in FIG. 28. If a frequency identification code is found on the general broadcast frequency from the PTAM 28, the logic 114 switches to that frequency and proceeds to send a query signal to establish a link as previously described. If the all frequencies busy identification code is being transmitted by the PTAM 28, the logic 114 generates a local busy signal, again as previously described, to indicate that an IR (or RF) link with the PTAM 28 has been established and that no lines are available.

Figure 29:
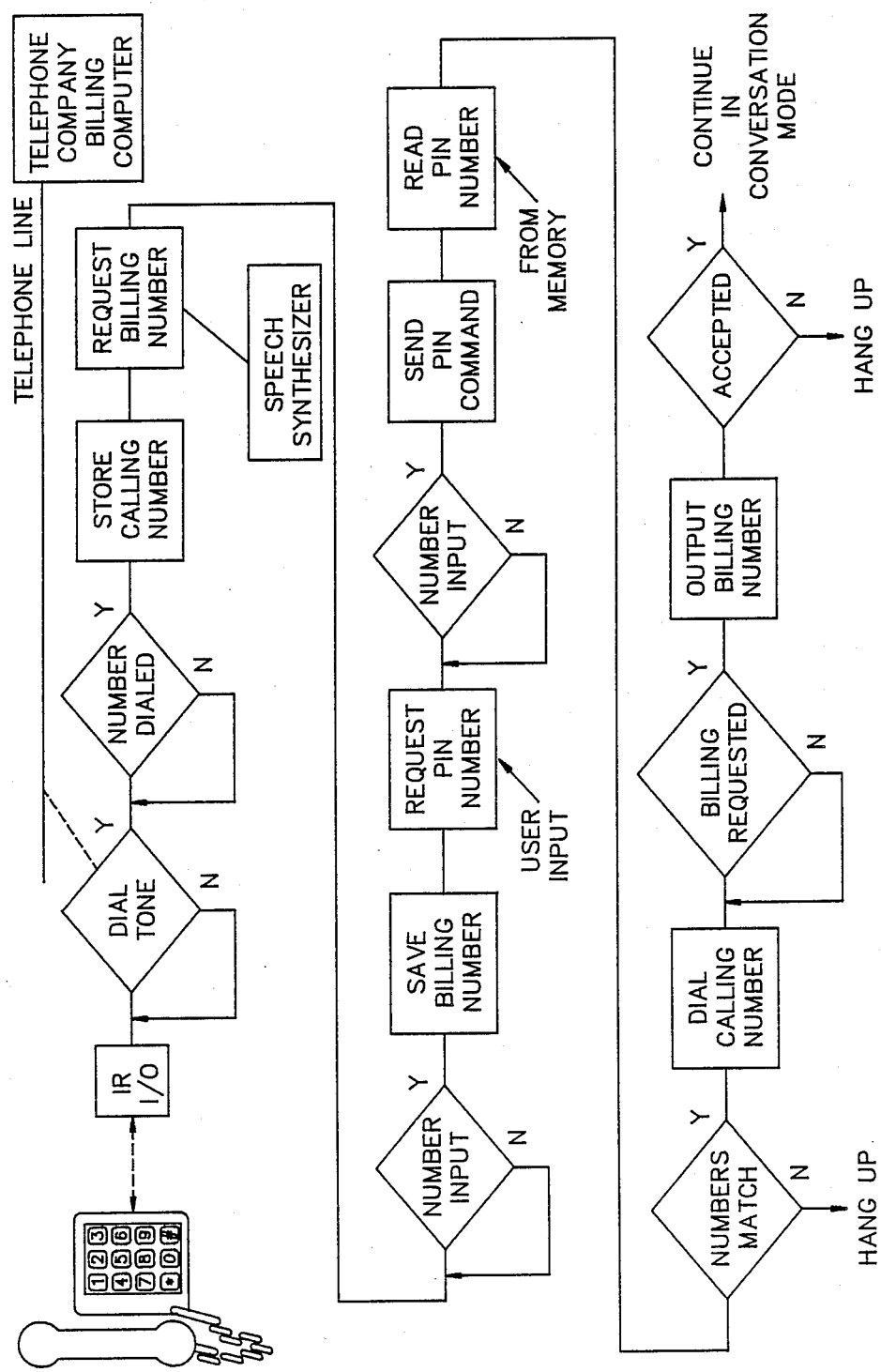
FIG. 29 is a logic flowchart showing the basic logic of the present invention in a preferred embodiment employed o provide an interface between the user and the telephone company billing computer for automatic billing and user verification.

Since there is not provision for the insertion of coins with the present invention, all costs for placing calls will, of course, have to be made against a credit billing such as a telephone "calling card" or other credit card accepted by the telephone service operator for such credit billings. While the remote telephone of the present invention can be used in a straight-through mode once the IR link 74 to the telephone line 14 is established, it is preferred that the PTAM 28 include further logic such as that of FIG. 29 to provide ease of billing and protection against unauthorized use. In the preferred embodiment, the remote telephone 36 or IRIOL 40 contains memory within its logic 84 for the inputting and storage of billing numbers and a personal identification number (PIN). This type of capability is well known in the art and, therefore, not necessary to be described herein. With the logic 98 of FIG. 21, after the query mode is completed and a dial tone is sensed on the telephone line 14, the logic waits for the calling number to be dialed by the user from the pad 16. The number is then stored in memory temporarily and the billing number requested of the user employing stored synthesized speech. It should be noted that during this time the user is not yet connected to the telephone line 14 and the only interconnection is between the user and the logic 98. The logic 98 waits for the user to input the billing number. This can be via the pad 16 or, preferably, by simply pressing a single button on the pad 16 (e.g. the * button) which causes the pre-stored billing number to be sent from memory. The logic 98 then saves the billing number and requests the input of the user's PIN number. Once that has been input by the user from the pad 16 the logic 98 sends a command to the logic on the user's end causing it to send the pre-stored PIN number of the instrument being used. If there is no match, the use of the instrument is denied and the logic 98 hangs up (or takes any other non-using action desired). If there is a match, the logic 98 dials the number on the telephone line 14 and, upon request therefor from the telephone company billing computer, outputs the billing number. If the billing is accepted, the connection between the user and the telephone line 14 established for continuation in the conversation mode. If not, the logic hangs up or takes other appropriate action.

While not specifically shown at this time, the applicants anticipate possible future cooperation between the telephone company and users of the present invention such that the billing and PIN verification could take place without the involvement of the PTAM 28 and its logic. In such case, for example, the user's instrument could be provided with a unique, internal serial or identification number. That number could be registered with the using telephone company along with an associated PIN number. When placing a call, the user when asked for a billing number would cause the instrument's internal number to be sent. The number would be recognized by the billing computer which, in turn, would request the user input his PIN number for user verification.

Figure 30:
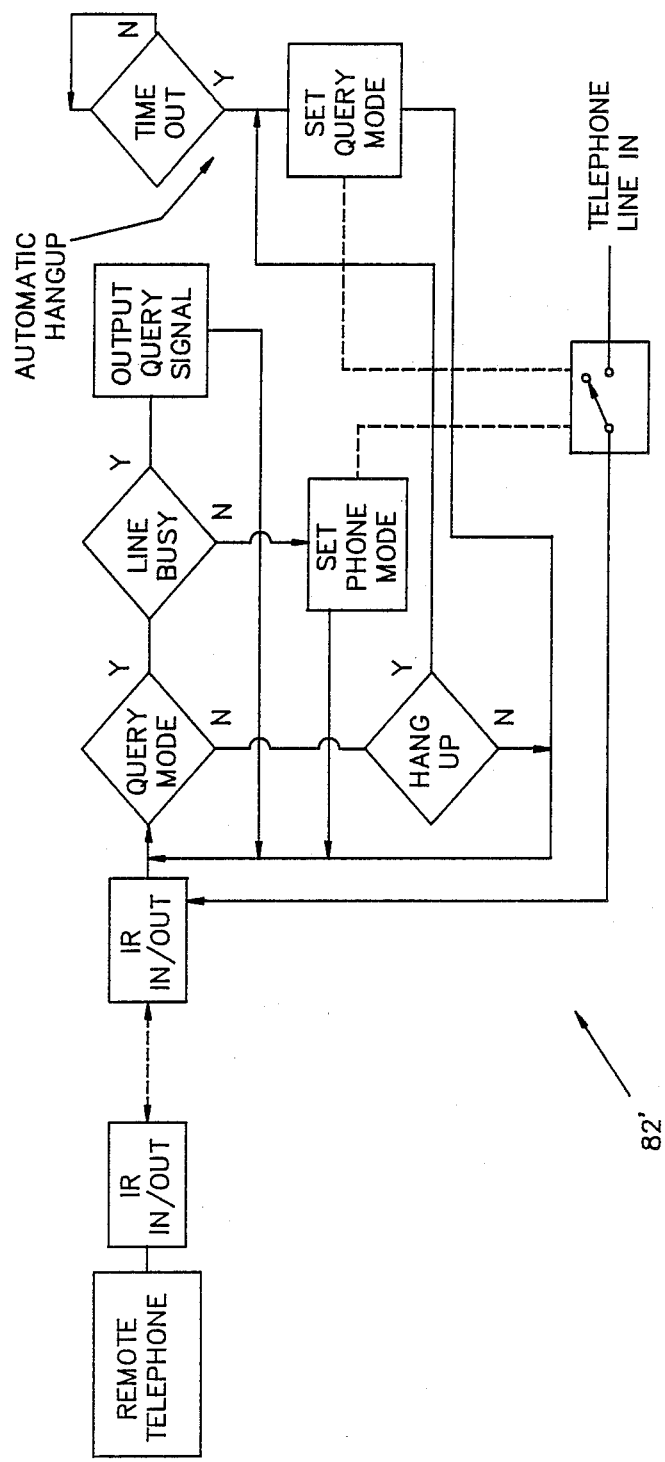
FIG. 30 is a logic flowchart showing the basic logic of the present invention employed to connect and disconnect the infrared input/output module when in a stand-alone mode not in combination with a telephone sharing the same telephone line.

Finally, FIG. 30 shows the logic 82' which would be involved in the PTAM 28 when not employed in combination with a local telephone, i.e. on a remote, raised pole location, or the like, including some features not previously discussed that would be applicable in either configuration. In particular, the PTAM logic 82 or 82' is provided with an automatic hangup logic portion which continues to operate during any call once an IR link 74 has been established and prior to the instrument being hung up physically (as by turning the switch 44 to its "OFF" position). As can be seen, the logic 82' contains a time out checking loop that monitors the IR link 74 for modulation of the carrier, i.e. for line use. There is sufficient time provided for someone or something to pass through the IR light beam 94 in a transient state without breaking the connection. This need only be a few seconds, however. If the logic 82' times out, the connection to the telephone line 14 is disconnected affecting an automatic hangup to prevent extended credit billing on an unused connection.

Wherefore, having thus described the present invention, what is claimed is:

1. Apparatus for permitting remote access by telephone devices to a public telephone line comprising:
   (a) public telephone access module means for receiving remote telephone transmissions and for connecting them to the public telephone line, said public telephone access module means including visible indicia of its presence and location and first interface module means for wirelessly transmitting and receiving telephone communications by means of a beam of infrared energy;
   (b) remote telephone interface means operably connected to a telephone device for interfacing between said telephone device and said public telephone access module means including second interface module means for transmitting and receiving telephone communications by means of said beam of infrared energy; and,
   (c) interference prevention means disposed in a communication path for said beam of infrared energy between said first interface module means and said second interface module means for preventing more than one said second interface module means from making a connection to the public telephone line through said first interface module means at a time.

2. The remote public telephone access apparatus of claim 1 wherein:
   said public telephone access module means is disposed within a case and said interference prevention means comprises a passageway therethrough communicating with said first interface module means and including means for limiting the area from which said beam of infrared energy can enter said public telephone access module means to a narrow field of view directly in from of said case.

3. The remote public telephone access apparatus of claim 2 wherein:
   (a) said first interface module means includes infrared detector means for detecting said beam of infrared energy and for developing an electrical signal therefrom; and,
   (b) said passageway includes fiber optic conducting means for conducting said beam of infrared energy between said opening and said infrared detector means.

4. The remote public telephone access apparatus of claim 3 wherein:
 (a) said first interface module means includes a plurality of said infrared detector means;
 (b) said passageway includes a plurality of said fiber optic conducting means for conducting a plurality of said beams of infrared energy between said opening and respective ones of said infrared detector means; and,
 (c) means within said opening and communicating with said plurality of said fiber optic conducting means for limiting the area from which a said beam of infrared energy can enter respective ones of said fiber optic conducting means a narrow field of view exclusive of others of respective ones of said fields of view; and wherein additionally,
 (d) said public telephone access module means is connected to a plurality of public telephone lines and includes logic for selectively connecting said electrical signals from said plurality of said infrared detector means to individual ones of the plurality of public telephone lines whereby only one telephone device at a time can connect to each of said plurality of telephone lines with a said second interface module means thereof.

5. The remote public telephone access apparatus of claim 1 wherein:
 said first interface module means is removable from said remote telephone interface means whereby said first interface module means can be placed on a stable surface and pointed with said beam of infrared energy directed at said public telephone access module means.

6. The remote public telephone access apparatus of claim 1 wherein:
 said first interface module means is pivotally mounted in said remote telephone interface means for movement in a vertical plane whereby said remote telephone interface means can be placed on a stable generally horizontal surface and said remote telephone interface means and said first interface module means in combination can be rotated to point said beam of infrared energy at said public telephone access module means.

7. The remote public telephone access apparatus of claim 1 wherein said remote telephone interface means includes:
 (a) indicator means for visually indicating when a connection to the telephone line has been established; and,
 (b) dial means for dialing a number to the telephone line.

8. The remote public telephone access apparatus of claim 1 wherein said remote telephone interface means includes:
 jack means for operably connecting a telephone line using device thereto by plugging it into said jack means.

9. The remote public telephone access apparatus of claim 1 wherein:
 (a) said public telephone access module means is disposed in association with a public telephone including a handset connected for use at the location of the public telephone; and additionally comprising,
 (b) logic means for selectively connecting the handset or said public telephone access module, but not both, to the telephone line at any one time and for causing a busy signal to occur in the one not connected to the telephone line if said not connected one is attempted to be used by a user.

10. The remote public telephone access apparatus of claim 9 and additionally comprising:
 logic means for monitoring transmission to and from said remote telephone interface means when it is being used by a user and for causing said public telephone access module means to disconnect from the public telephone line if there is no transmission for a pre-established period of time whereby automatic hang-up is accomplished to prevent undesired charges from accruing.

11. The remote public telephone access apparatus of claim 1 wherein:
 (a) said remote telephone interface means includes logic for generating a query signal on said beam of infrared energy to be received by said public telephone access module means when said remote telephone interface means desires to establish a link with said public telephone access module means and for generating a busy signal to a user if a query signal is received in response from said public telephone access module means; and,
 (b) said public telephone access module means includes logic for generating a query signal on said beam of infrared energy to be received by said remote telephone interface means when said public telephone access module means is unable to connect said remote telephone interface means to the telephone line whereby a user knows that an infrared link has been established but no telephone line is presently available.

12. The remote public telephone access apparatus of claim 1 wherein said remote telephone interface means additionally includes:
 (a) pager receiver means for wirelessly receiving a telephone number to be called; and,
 (b) dial means for dialing said telephone number to be called to the telephone line.

13. The remote public telephone access apparatus of claim 1 wherein:
 (a) said public telephone access module means is connected through a switching circuit to a plurality of telephone lines and said interference prevention means includes logic for generating a next frequency to use signal on said beam of infrared energy to be received by said remote telephone interface means when said public telephone access module means has an unbusy one of said telephone lines available and for generating a no frequency available signal on said beam of infrared energy to be received by said remote telephone interface means when said public telephone access module means has no unbusy one of said telephone lines available; and,
 (a) said remote telephone interface means includes logic for switching to the frequency designated by said next frequency to use signal if received and for generating a busy signal to a user if a no frequency available signal is received.

14. The remote public telephone access apparatus of claim 1 wherein:
 said public telephone access module means includes logic for establishing a credit billing interface between said remote telephone interface means and the telephone line and for receiving credit billing information from said public telephone access module means and verifying it with a credit billing entity located at a billing central office to which calling charges will be billed before operably connecting said remote telephone interface means to the telephone line.

15. A public payphone telephone system providing remote access by telephone devices to telephone lines comprising:
  (a) a plurality of public telephone access modules disposed in separated locations and operably connected to a telephone line for receiving remote telephone transmissions and for connecting then to the telephone line, each of said public telephone access modules including visible indicia of its presence and location and first interface module means for wirelessly transmitting and receiving telephone communications by means of a beam of infrared energy;
  (b) remote telephone interface means operably associated with each of the telephone devices for selectively inferfacing between the telephone device and said public telephone access modules, each said remote telephone interface means including second interface module means for transmitting and receiving telephone communications by means of said beam of infrared energy; and,
  (c) interference prevention means disposed in a communication path for said beam of infrared energy between said first interface module means and said second interface module means for preventing more than one said second interface module means from making a connection to the public telephone line through said first interface module means at a time.

16. The public payphone telephone system of claim 15 wherein:
  said public telephone access modules are each disposed within a case and said interference preventing means comprises a passageway therethrough communicating with said first interface module means and including means for limiting the area from which said beam of infrared energy can enter said public telephone access module to a narrow field of view directly in front of said case.

17. The public telephone system of claim 16 wherein:
  (a) said first interface module means includes infrared detector means for detecting said beam of infrared energy and for developing an electrical signal therefrom; and,
  (b) said passageway includes fiber optic conducting means for conducting said beam of infrared energy between said opening and said infrared detector means.

18. The public payphone telephone system of claim 17 wherein:
  (a) said first interface module means includes a plurality of said infrared detector means;
  (b) said passageway includes a plurality of said fiber optic conducting means for conducting a plurality of said beams of infrared energy between said opening and respective ones of said infrared detector means;
  (c) said public telephone access modules are each connected to a plurality of telephone lines and include logic for selectively connecting said electrical signals from said plurality of said infrared detector means to individual ones of the plurality of telephone lines; and,
  (d) beam separation means disposed in said opening and associated with entry points to said plurality of said fiber optic conducting means for allowing only one said beam of infrared energy to enter respective ones of said plurality of said fiber optic conducting means at a time.

19. The public payphone telephone system of claim 16 wherein:
  said first interface module means is removable from said remote telephone interface means whereby said first interface module means can be placed on a stable surface and pointed with said beam of infrared energy directed at said public telephone access modules.

20. The public payphone telephone system of claim 16 wherein:
  said first interface module means is pivotally mounted in said remote telephone interface means for movement in a vertical plane whereby said remote telephone interface means can be placed on a stable generally horizontal surface and said remote telephone interface means and said first interface module means in combination can be rotated to point said beam of infrared energy at a said public telephone access module.

21. The public payphone telephone system of claim 15 wherein said remote telephone interface means includes:
  jack means for operably connecting a telephone line using device thereto by plugging it into said jack means.

22. The public payphone telephone system of claim 15 wherein:
  (a) said public telephone access modules are each disposed in association with a public telephone including a handset connected for use at the location of the public telephone; and additionally comprising,
  (b) logic means for selectively connecting the handset or said public telephone access module, but not both, to the telephone line at any one time and for causing a busy signal to occur in the one not connected to the telephone line if said not connected one is attempted to be used by a user.

23. The public payphone telephone system of claim 22 and additionally comprising:
  logic means for monitoring transmission to and from said remote telephone interface means when it is being used by a user and for causing a said public telephone access module to disconnect from the telephone line if there is no transmission for a pre-established period of time whereby automatic hang-up is accomplished to prevent undesired charges from accruing.

24. The public payphone telephone system of claim 15 wherein:
  (a) said remote telephone interface means includes logic for generating a query signal on said beam of infrared energy to be received by a said public telephone access module when said remote telephone interface means desires to establish a link with said public telephone access module and for generating a busy signal to a user if a query signal is received in response from said public telephone access module; and,
  (b) said public telephone access modules each include logic for generating a query signal on said beam of infrared energy to be received by said remote telephone interface means when a said public telephone access module is unable to connect said remote telephone interface means to the telephone line whereby a user knows that an infrared link has been established but no telephone line is presently available.

25. The public payphone telephone system of claim 15 wherein said remote telephone interface means additionally includes:
  (a) pager receiver means for wirelessly receiving a telephone number to be called; and,
  (b) dial means for dialing said telephone number to be called to the telephone line.

26. The public payphone telephone system of claim 15 wherein:
  (a) each said public telephone access module is connected through a switching circuit to a plurality of telephone lines and includes logic for generating a next frequency to use signal on said beam of infrared energy to be received by said remote telephone interface means when said public telephone access module has an unbusy one of said telephone lines available and for generating a no frequency available signal on said beam of infrared energy to be received by said remote telephone interface means when said public telephone access module has no unbusy one of said telephone lines available; and,
  (a) said remote telephone interface means includes logic for switching to the frequency designated by said next frequency to use signal if received and for generating a busy signal to a user if a no frequency available signal is received.

27. The public payphone telephone system of claim 15 wherein:
  (a) each said public telephone access module includes logic for generating a next frequency to use signal on said beam of infrared energy to be received by said remote telephone interface means when said public telephone access module has an unbusy telephone line available and for generating a no frequency available signal on said beam of infrared energy to be received by said remote telephone interface means when said public telephone access module has no unbusy telephone line available; and,
  (a) said remote telephone interface means includes logic for switching to the frequency designated by said next frequency to use signal if received and for generating a busy signal to a user if a no frequency available signal is received.

28. The public payphone telephone system of claim 15 and additionally comprising:
  logic associated with each said remote telephone interface means for establishing a credit billing interface between said remote telephone interface means and the telephone line and for receiving credit billing information from said public telephone access modules including logic for verifying said credit billing information with a credit billing entity to which calling charges are to be billed located at a remote site before operably connecting said remote telephone interface means to the telephone line.

* * * * *